Figure 1:
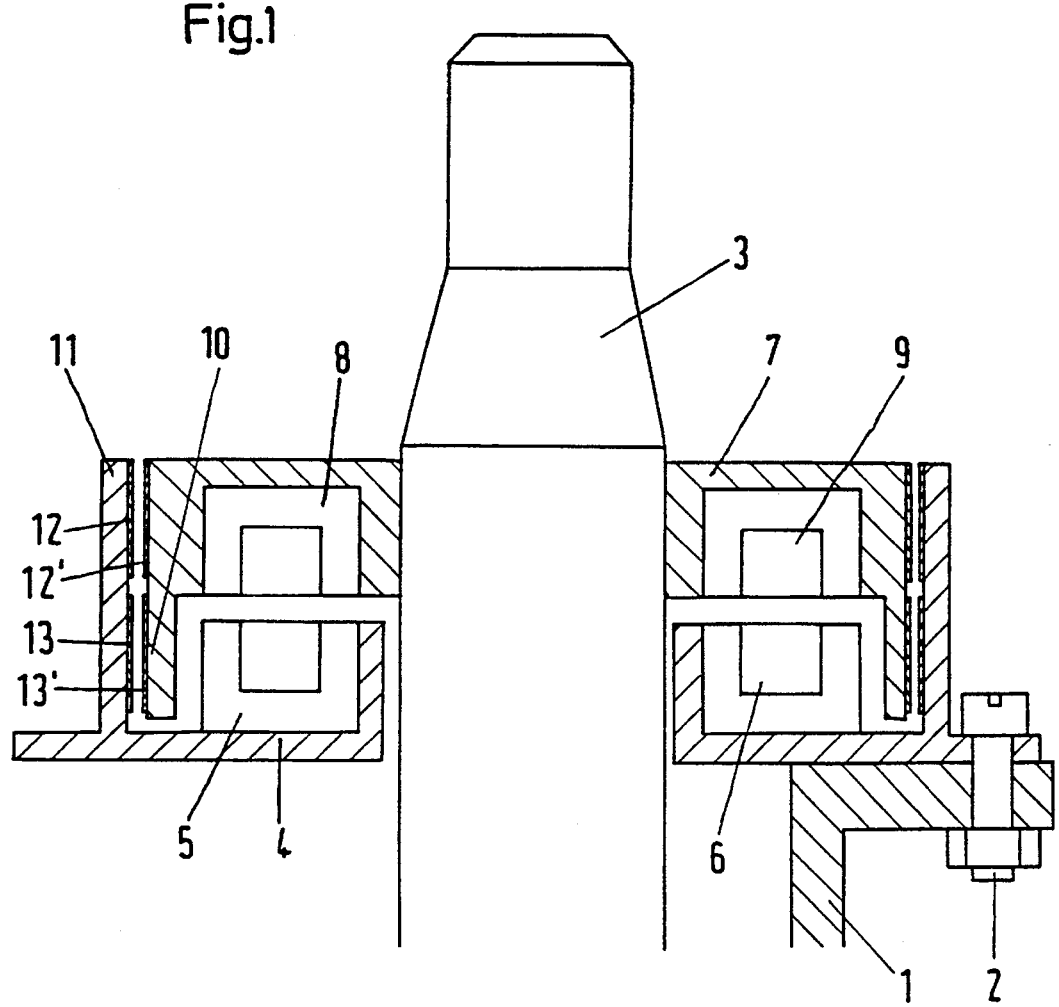

United States Patent [19]

Bossler et al.

[11] Patent Number: 5,498,911
[45] Date of Patent: Mar. 12, 1996

[54] APPARATUS FOR TRANSMITTING ELECTRIC POWER AND DATA IN MOTOR VEHICLES

[75] Inventors: Hans J. Bossler, Münster; Martin Kreuzer, Kleinwallstadt, both of Germany

[73] Assignee: Kolbenschmidt Aktiengesellschaft, Neckarsulm, Germany

[21] Appl. No.: 355,422

[22] Filed: Dec. 13, 1994

Related U.S. Application Data

[63] Continuation of Ser. No. 202,716, Feb. 23, 1994, abandoned, which is a continuation of Ser. No. 900,578, Jun. 18, 1992, abandoned.

[30] Foreign Application Priority Data

Jun. 22, 1991 [DE] Germany ............................ 41 20 650.9

[51] Int. Cl.$^6$ ................................................ H04B 9/00
[52] U.S. Cl. ...................................... 307/10.1; 340/870.31
[58] Field of Search ........................... 307/10.1–10.7, 307/9.1; 340/870.31, 825.54, 870.32; 375/6; 439/164, 15; 364/426.04; 180/170, 176, 179; 336/123

[56] References Cited

U.S. PATENT DOCUMENTS 4,404,559  9/1983  Renner ................. 340/870.28
4,547,636  10/1985  Mizuno et al. ............... 200/61.54
4,766,326  8/1988  Hayashi et al. ................. 307/10
4,792,965  12/1988  Morgan ...................... 340/870.31

FOREIGN PATENT DOCUMENTS 3915188   5/1989   Germany.
58-115945  7/1983   Japan.
59-92226   5/1984   Japan.

OTHER PUBLICATIONS

Patent Abstracts of Japan, vol. 8, No. 203, Sep. 1984.
Patent Abstracts of Japan, vol. 7, No. 226, Oct., 1983.

*Primary Examiner*—Peter S. Wong
*Assistant Examiner*—Aditya Krishnan
*Attorney, Agent, or Firm*—Sprung Horn Kramer & Woods

[57] ABSTRACT

In an apparatus for transmitting electric power and data between the vehicle side and the steering wheel side of a motor vehicle, a transformer is used, which comprises a stationary primary coil on the vehicle side and a secondary coil, which is provided on the steering wheel side and is non-rotatably connected to the steering shaft. Data are transmitted by a capacitor, which comprises stationary conductor strips which are provided on the vehicle side and surround the steering column and conductor strips which are provided on the steering wheel side and register with the stationary conductor strips and surround and are non-rotatably connected to the steering shaft.

1 Claim, 1 Drawing Sheet

APPARATUS FOR TRANSMITTING ELECTRIC POWER AND DATA IN MOTOR VEHICLES

This application is a continuation, of application Ser. No. 08/202,716, filed Feb. 23, 1994 now abandoned which is a continuation of Ser. No. 07/900,578, filed on Jun. 18, 1992 now abandoned.

This invention relates to an apparatus for transmitting electric power and data between the vehicle side and the steering wheel side of a motor vehicle by means of a bipartite transformer, which is coaxial to the steering shaft and comprises a stationary shell core, which is provided on the vehicle core and surrounds the steering column and is U-shaped in section and extends around a primary coil, and a shell core, which is U-shaped in section and is provided on the steering wheel side and surrounds and is non-rotatably connected to the steering shaft and extends around a secondary coil, an air gap being provided between said shell cores.

Electrical means provided on the rotatable part of the steering system of motor vehicles and stationary electric means provided on the vehicle side are generally connected by a slip ring, which provides an electrical connection by means of sliding contacts. Because such a connection may be disturbed by dust, moisture, corrosion and by vibrations of the motor vehicle and for this reason is not highly reliable, particularly as regards the means for actuating an air bag apparatus for impact protection, which is integrated in the steering wheel and in the instrument panel, DE-A-3,041,257 discloses a current-conducting connector between relatively rotatable parts of steering systems of motor vehicles. That connector consists of a spiral spring, which is made of electrically conductive material and accommodated in a housing. The housing is bipartite and comprises an inner part, which is non-rotatably connected to the steering shaft and is provided with a core, which serves to wind up the spiral spring. The housing also comprises a stationary outer part. Various modifications of that current-conducting connector are based on the same basic principle and have been described, e.g., in DE-A-3,908,179, DE-A-3,150,427 and EP-B-0,195,833.

However such current-conducting connectors no longer comply with the requirements which in modern motor vehicles are to be met as regards control and indicating elements which are integrated in the steering wheel and particularly as regards the air bag apparatus for impact protection which is integrated in the steering wheel and the instrument panel.

For this reason a further development has resulted in an apparatus for a non-contacting transmission of information generated by a plurality of control elements provided on the steering wheel to an information recognition system that is provided on the vehicle side. Such an apparatus is disclosed in EP-B-0,183,580. In that case an annular primary coil is provided on the vehicle side and is surrounded by a shell core, which is U-shaped in section, and a rotatable annular secondary coil is provided on the steering wheel side and is surrounded by a shell core which is U-shaped in section. Both said coils are coaxial to the steering shaft and there is an air gap between the two shell cores. To ensure a reliable transmission of the pulses which are generated by a plurality of control elements provided in the steering wheel, the air gap must not be changed. For this reason, special means are required for maintaining the air gap constant during the angular movement of the secondary coil relative to the primary coil.

In view of that prior art it is an object of the present invention so to improve the apparatus described hereinbefore that a reliable transmission of electric power to the steering wheel is ensured and that for the performance of indicating and control functions and undisturbed transmission of data from the steering wheel, e.g., to control the horn and the radio, and to the steering wheel, e.g., to indicate the frequency selected for the radio and for monitoring indications, will be ensured.

That object is accomplished in that a capacitor is provided, which is coaxial to the bipartite transformer and consists of stationary conductor strips which are provided on the vehicle side and surround the steering column, and of conductor strips, which are provided on the steering wheel side and register and define an air gap with said stationary conductor strips and surround and are non-rotatably connected to the steering shaft.

Electric power required in the steering wheel is inductively transmitted by the coils which are surrounded by the shell cores. The primary coil is activated by a pulse, which is generated by a switch, such as a transistor, and which results in a build-up of magnetic energy, which when the pulse is terminated is discharged into the secondary coil and in the latter generates a current, which is conducted to the capacitor and to the consumer. On the steering wheel side the electric power is converted by a rectifier circuit to a d.c. voltage and is controlled by the electronic circuitry provided on the steering wheel side. The level of the power which is transmitted will depend on the ratio of the ON time to the OFF time of the switch. During a controlled operation only that power will be transmitted which is required on the steering wheel side. For that control, different pulse widths are selected in alternation.

Data are transmitted from the steering wheel side to the vehicle side and from the vehicle side to the steering wheel side via the capacitor, which is independent of the inductive transmission of power. On the vehicle side and on the steering wheel side the capacitor is connected to identical activating and evaluating circuits because data are transmitted in both directions.

To minimize interfering magnetic fields and to ensure a high efficiency, the air gap between the shell cores has a width of 0.3 mm to 1 mm.

Because the air gap of the capacitor is required to have a width of 0.2 to 0.5 mm, the capacity of the capacitor is relatively low so that special means are required to activate the capacitor so as to avoid an interference by electromagnetic fields.

In addition, the transmission of data is synchronized with the frequency of the transformer in order to avoid an interference by electromagnetic fields.

According to a preferred embodiment of the invention the capacitor consists of four conducting conductor strips, which are arranged in two pairs of registering strips.

A preferred feature of the capacitor resides in that the conductor strips consists of concentric cylindrical sleeves, which desirably surround the transformer. The conductor strips may alternatively consist of coaxial annular disks arranged in a row.

The capacitor composed of sleeves suitably surrounds the transformer.

The shell cores preferably consist of ferrite cores, which have a high initial permeability to prevent an emergence of magnetic fields from the core in case of a relatively high saturation. Besides, ferrite cores have a very high electric resistance and low magnetic losses.

To prevent an emergence of interfering fields to the outside, the transformer and the capacitor are provided with shielding means, preferably of sheet steel.

The data which are generated in the steering wheels by corresponding momentary-contact switches are transmitted to the vehicle side, where they serve to control the car radio and the tachometer. The momentary-contact switches provided on the vehicle side are used to control indicating lights provided in the steering wheel to indicate certain operating conditions, such as oil level, driving light, etc. Besides, the data of the car radio can be transmitted to the steering wheel for a display of the frequency and other radio data.

The voltage for the control and for the indications must be buffered by means of a capacitor because the electrical energy is transmitted only by pulses. When the switch is on, the power must be transmitted by the capacitor. The power required for the air bag apparatus for impact protection is stored in that the voltage transmitted by the transformer is stored in a separate capacitor or in a storage battery and is used to ignite the gas generator in response to a signal transmitted by the capacitor in case of an accident.

The invention is illustrated by way of example in the drawing and will be explained more in detail hereinafter.

Figure 2:
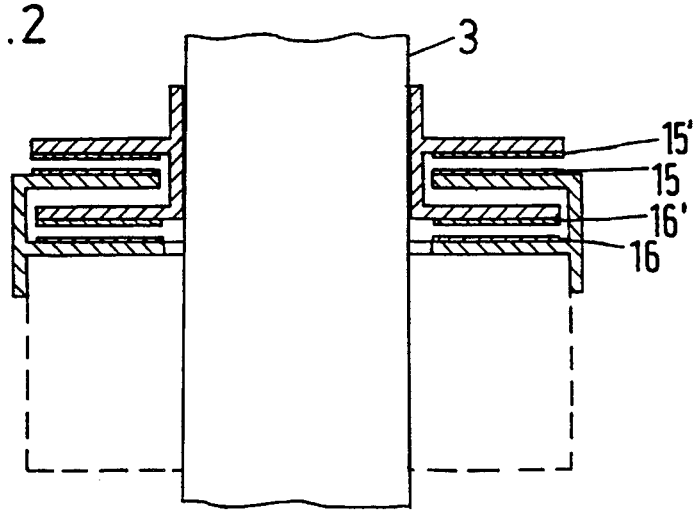

The invention will be further described with reference to the accompanying drawing, wherein:

FIG. 1 is a longitudinal view showing a steering shaft and, in section, the capacitor and transformer elements associated therewith, the conductor strips of the capacitor being concentrically arranged cylindrical sleeves; and FIG. 2 is a sectional view of a capacitor with conductor strips which consist of annular disks arranged in a row.

Referring now more particularly to FIG. 1, it shows a steering shaft, to which that capacitor half and that transformer half which are provided on the steering wheel side are non-rotatably connected, and also shows that transformer half and that capacitor half which are provided on the vehicle side and are fixed to the frame of the vehicle.

The mounting flange 1 provided on the vehicle side is coaxially connected by the screw 2 to the housing 4, which is U-shaped in section and fixed to the frame and surrounds the steering shaft 3 and is open toward the steering wheel. The cavity of the housing 4 contains an annular primary coil 6, which is surrounded by the shell core 5, which consists of ferrite. On the steering wheel side a housing 7 is provided, which is U-shaped in section and is open on the vehicle side and is coaxial and non-rotatably connected to the steering shaft 3 and contains an inserted annular secondary coil 9, which is surrounded by a shell core 8. The radial outer legs 11 and 10 of the housings 4 and 7 on the vehicle side and on the steering wheel side, respectively, are axially extended and overlap in the form of two concentric sleeves. Two closely spaced apart registering and closely spaced apart pairs of conductor strips 12, 13 and 12', 13' are attached to the inside surface of the leg 11 of the housing 4 on the vehicle side and to the outside surface of the leg 10 of the housing 7 on the steering wheel side.

FIG. 2 shows a capacitor 14, which is composed of two pairs of registering and closely spaced apart annular disks 15, 15' and 16, 16', which serve as conductor strips. The two annular disks 15', 16' are non-rotatably connected to the steering shaft 3, and the two annular disks 15, 16 are provided on the vehicle side and fixed to the frame. The two halves of the transformer, not shown, may be arranged under the capacitor in the region which is defined by the broken line.

The advantages afforded by the invention reside particularly in a reliable and undisturbed transmission of power and data and in a transmission of complex data information without noise and wear.

It will be appreciated that the instant specification and claims are set forth by way of illustration and not limitation, and that various modifications and changes may be made without departing from the spirit and scope of the present invention.

We claim:

1. In an apparatus for transmitting electric power and data between the vehicle side and the steering wheel side of a motor vehicle by means of a bipartite transformer, which is coaxial to a steering shaft and comprises a stationary first and second shell cores, which is provided on a vehicle core and surrounds a steering column and is U-shaped in section and extends around a primary coil, and first and second shell cores, which are U-shaped in section and are provided on the steering wheel side and surrounds and is non-rotatably connected to the steering shaft and extends around a secondary coil, an air gap being provided between said shell cores, the improvement which comprises a capacitor coaxial to the bipartite transformer and comprising stationary conductor strips (12, 13, 15, 16), which are provided on the vehicle side and surround the steering column, and conductor strips (12', 13', 15', 16'), which are provided on the steering wheel side and define an air gap with said stationary conductor strips and said stationary conductor strips surround the steering shaft and are non-rotatably connected to the steering shaft (3), the air gap between the shell cores (5,8) of the capacitors having a width of 0.3 to 1 mm, the air gap between at least two said conductor strips (12, 12', 13, 13', 15, 15', 16, 16') of the capacitors having a width of 0.2 to 0.5 mm, the conductor strips (12, 12', 13' 13') being concentrically arranged cylindrical sleeves or the conductor strips (15, 15', 16, 16') comprising annular disks arranged in a row, the capacitor comprising at least four conductor strips (12, 12', 13, 13', 15, 15', 16, 16') which are arranged in pairs of registering strips, the capacitor comprising sleeves which surround the transformer, the shell cores (5,8) comprising ferrite, and the transformer and the capacitor being provided with shielding means made of steel.

* * * * *

UNITED STATES PATENT AND TRADEMARK OFFICE
CERTIFICATE OF CORRECTION

PATENT NO. : 5,498,911
DATED : March 12, 1996
INVENTOR(S) : Bossler, et al.

It is certified that error appears in the above-indentified patent and that said Letters Patent is hereby corrected as shown below:

Col. 4, line 28    Delete " surrounds " and substitute
                   -- surround the steering shaft --

Signed and Sealed this

Twenty-third Day of July, 1996

*Attest:*

BRUCE LEHMAN

*Attesting Officer*        *Commissioner of Patents and Trademarks*